(12) United States Patent
Aycock et al.

(10) Patent No.: US 7,124,572 B2
(45) Date of Patent: Oct. 24, 2006

(54) RECUPERATOR AND TURBINE SUPPORT ADAPTER FOR RECUPERATED GAS TURBINE ENGINES

(75) Inventors: Larry W. Aycock, Chandler, AZ (US); Brian D. Koch, Gilbert, AZ (US); Howard M. Becker, Chandler, AZ (US); Michael J. Durden, Chandler, AZ (US); John R. Barrett, Mesa, AZ (US); Robert A. Kime, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 198 days.

(21) Appl. No.: 10/940,527

(22) Filed: Sep. 14, 2004

(65) Prior Publication Data

US 2006/0053799 A1 Mar. 16, 2006

(51) Int. Cl.
*F02C 7/10* (2006.01)
*F02G 1/00* (2006.01)

(52) U.S. Cl. ............ 60/39.511; 60/772; 415/142
(58) Field of Classification Search ............ 60/39.511, 60/772; 415/142
See application file for complete search history.

(56) References Cited

U.S. PATENT DOCUMENTS

| | | | |
|---|---|---|---|
| 2,941,781 A * | 6/1960 | Boyum | 415/142 |
| 3,398,535 A * | 8/1968 | Campbell et al. | 60/226.1 |
| 3,830,058 A * | 8/1974 | Ainsworth | 60/226.1 |
| 4,138,847 A | 2/1979 | Hill | |
| 4,474,000 A | 10/1984 | Benson et al. | |
| 4,492,518 A * | 1/1985 | Neal | 415/142 |
| 4,859,143 A * | 8/1989 | Larrabee et al. | 415/142 |
| 4,979,872 A * | 12/1990 | Myers et al. | 415/142 |
| 4,987,736 A * | 1/1991 | Ciokajlo et al. | 60/797 |
| 4,993,223 A | 2/1991 | Kretzinger | |
| 5,065,816 A | 11/1991 | Darragh | |
| 5,076,049 A * | 12/1991 | Von Benken et al. | 60/797 |
| 5,284,011 A * | 2/1994 | Von Benken | 60/796 |
| 5,292,227 A * | 3/1994 | Czachor et al. | 415/209.3 |
| 5,306,117 A * | 4/1994 | Bear et al. | 415/142 |
| 5,368,095 A | 11/1994 | Kadambi et al. | |
| 5,388,398 A | 2/1995 | Kadambi et al. | |
| 5,497,615 A | 3/1996 | Noe et al. | |
| 5,634,767 A * | 6/1997 | Dawson | 415/134 |
| 5,685,156 A | 11/1997 | Willis et al. | |
| 5,855,112 A | 1/1999 | Bannai et al. | |
| 6,358,001 B1 * | 3/2002 | Bosel et al. | 415/142 |
| 6,438,936 B1 | 8/2002 | Ryan | |
| 6,469,841 B1 * | 10/2002 | Nomura et al. | 359/699 |
| 6,601,392 B1 | 8/2003 | Child | |
| 6,634,176 B1 | 10/2003 | Rouse et al. | |
| 6,691,410 B1 | 2/2004 | Bucey et al. | |
| 6,983,608 B1 * | 1/2006 | Allen et al. | 60/798 |

(Continued)

*Primary Examiner*—William Rodriguez
(74) *Attorney, Agent, or Firm*—Ingrassia Fisher & Lorenz (57) ABSTRACT

A recuperator and turbine support adapter for securing a recuperator to a combustor case is provided. The recuperator and turbine support adapter comprises an outer strutted body, an inner strutted body and a thermal spring. The thermal spring allows for thermal expansion of the recuperator and turbine support adapter while alleviating any stress or fatigue damage to the adapter. Each of the outer strutted bodies further comprises an outer ring and an inner ring connected by a plurality of struts. The recuperator and turbine support adapter also provides a means of directing the flow of cold compressed air to the recuperator and the return of the recuperator heated air to the combustor/turbine module.

30 Claims, 7 Drawing Sheets

U.S. PATENT DOCUMENTS

2002/0040576 A1   4/2002  Fleer et al.

2002/0073688 A1   6/2002  Bosley et al.

* cited by examiner

RECUPERATOR AND TURBINE SUPPORT ADAPTER FOR RECUPERATED GAS TURBINE ENGINES

GOVERNMENT RIGHTS

This invention was made with Government support under DAAE07-02-3-0002 awarded by the US Army. The Government has certain rights in this invention.

BACKGROUND OF THE INVENTION

The present invention relates to a recuperator and turbine support adapter for a recuperated gas turbine engine, and more specifically to a recuperator and turbine support adapter with a thermal spring for attaching a recuperator to the engine.

Gas turbine engines often may use a heat exchanger or recuperator to increase operational efficiency by extracting heat from the exhaust gas in order to preheat the air entering the combustor. Recuperators are specifically designed to operate in extreme environments. The hot-pass side of the recuperator is subjected to pressurized engine exhaust gas in excess of 1000° F. Meanwhile, the cold-pass side of the recuperator receives compressed ambient air at temperatures which may exceed 600° F. The potentially destructive combination of high pressure differentials, high thermal differentials, and corrosive combustion by-products is amplified by thermal cycling and startup/shutdown cycles. Thus, the recuperator must be extremely rugged, while being flexible to accommodate thermal growth.

U.S. Pat. No. 4,474,000 discloses a design for mounting a recuperator to a gas turbine engine. The mounting system has flexible metal seal elements where the recuperator is joined to the engine that prevent compressor discharge air from escaping into the exhaust stream. The flexible metal seals also allow for thermal growth of the recuperator. The flexible metal seals, however, are limited by the thermal expansion capabilities of the materials used to make the seals. Therefore, over time and/or under extreme conditions, leaks and damage may occur.

U.S. Pat. No. 6,601,392 discloses an apparatus having spring supports for supporting a recuperator of a microturbine engine. The springs of the apparatus allow for thermal expansion of the turbine with a minimum amount of force being applied to the turbine. The apparatus is limited to use with microturbine engines where the recuperator is mounted in a vertical position above the turbine. The springs of the apparatus do not assist the recuperator in relieving internal thermal stresses within the recuperator.

As can be seen, there is a need for a recuperator and turbine support adapter for a recuperated gas turbine engine that can withstand exposure to extreme thermal and pressure gradients.

SUMMARY OF THE INVENTION

In one aspect of the present invention there is provided a recuperator and turbine support adapter comprising an annular outer strutted body, wherein the outer strutted body comprises a first outer ring and a first inner ring, the first outer ring and first inner ring connected by a plurality of outer struts; an annular inner strutted body wherein the inner strutted body comprises a second outer ring and a second inner ring, the second outer ring and second inner ring connected by a plurality of inner struts; and a thermal spring connecting the first inner ring of the outer strutted body and the second outer ring of the inner strutted body. The inner and outer strutted bodies may have the same number of outer and inner struts, respectively or they may have a different number of struts. The outer struts of the outer strutted body may be aligned with the inner struts of the inner strutted body, thereby providing an open passage for service lines to pass through the adapter. Moreover, the struts may be arranged randomly or symmetrically arranged around the outer or inner strutted body.

In another aspect of the invention there is provided a recuperator and turbine support adapter comprising an annular outer strutted body, wherein the outer strutted body comprises a first outer ring and a first inner ring, the first outer ring connected to the first inner ring by at least three outer struts, wherein the outer struts are symmetrically arranged around the outer strutted body, and wherein the outer strutted body further comprises a first forward flange and a first aft flange, the first forward flange and the first aft flange disposed on the first outer ring; an annular inner strutted body wherein the inner strutted body comprises a second outer ring and a second inner ring, the second outer ring connected to the second inner ring by at least three inner struts, wherein the inner struts are symmetrically arranged around the inner strutted body, and wherein the inner strutted body further comprises a second forward flange and a second aft flange, the second forward flange and second aft flange disposed on the second inner ring; wherein at least one outer strut and at least one inner strut are aligned with one another, to provide an open passage; and a thermal spring connecting the first inner ring of the outer strutted body and second outer ring of the inner strutted body.

In yet another aspect of the present invention there is provided a recuperator system for a gas turbine engine comprising a recuperator and a recuperator and turbine support adapter coupled to the recuperator, wherein said recuperator and turbine support adapter comprises an annular outer strutted body, wherein the outer strutted body comprises a first outer ring and a first inner ring, first outer ring and first inner ring connected by a plurality of outer struts, an annular inner strutted body wherein the inner strutted body comprises a second outer ring and a second inner ring, second outer ring and second inner ring connected by a plurality of inner struts, and a thermal spring connecting the first inner ring of the outer strutted body and the second outer ring of the inner strutted body. The recuperator and turbine support adapter may further comprise forward and aft flanges on both the outer and inner strutted bodies. The recuperator system may also comprise a turbine bearing support housing attached to the forward or aft flanges of the inner strutted body.

In a further aspect of the present invention there is provided a recuperated turbine engine comprising a gas turbine engine; a recuperator coupled to the gas turbine engine; and a recuperator and turbine support adapter coupled to the recuperator and the gas turbine engine, wherein the recuperator and turbine support adapter comprises an annular outer strutted body, wherein the outer strutted body comprises a first outer ring and a first inner ring, the first outer ring and the first inner ring connected by a plurality of outer struts, wherein the first outer ring further comprises a first forward flange and a first aft flange; an annular inner strutted body wherein the inner strutted body comprises a second outer ring and a second inner ring, the second outer ring and the second inner ring connected by a plurality of inner struts, wherein the second inner ring further comprises a second forward flange and a second aft flange, and a thermal spring connecting the inner ring of the outer strutted body and the outer ring of the inner strutted body; and a combustor case for securing the recuperator and turbine support adapter and recuperator to the gas turbine engine.

In another aspect of the present invention there is provided a method of heating compressed air in a gas turbine engine comprising the steps of flowing cold compressed air between outer struts of an outer strutted body of a recuperator and turbine support adapter into a recuperator, the recuperator and turbine support adapter for securing the recuperator to a combustor case of the gas turbine engine; heating the cold compressed air in the recuperator to provide heated compressed air; flowing the heated compressed air from the recuperator to a combustor, wherein the heated compressed air flows between inner struts of an inner strutted body of the recuperator and turbine support adapter; and wherein the recuperator and turbine support adapter comprises an annular outer strutted body, wherein the outer strutted body comprises a first outer ring and a first inner ring, first outer ring and first inner ring connected by a plurality of outer struts, an annular inner strutted body wherein the inner strutted body comprises a second outer ring and a second inner ring, second outer ring and second inner ring connected by a plurality of inner struts, and a thermal spring connecting the first inner ring of the outer strutted body and the second outer ring of the inner strutted body. The compressed air is heated from a temperature of from about 500° F. to about 700° F. to about 1100° F. to about 1300° F.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, a recuperator and turbine support adapter for securing a recuperator and a turbine bearing support housing to a combustor case of a gas turbine engine is provided by the present invention. The recuperator and turbine support adapter may comprise an annular outer strutted body, an annular inner strutted body and a thermal spring connecting the outer strutted body and the inner strutted body. Both the outer and inner strutted bodies may comprise an outer ring, an inner ring and a plurality of struts, wherein the inner and outer rings of the strutted bodies are connected by the struts. The recuperator and turbine support adapter may further comprise flanges for connecting and sealing the recuperator and turbine support adapter to the combustor case, recuperator and turbine bearing support housing. In a recuperated gas engine the recuperator and turbine support adapter of the present invention provides an attachment interface for the recuperator, provides a flow path for the gases exiting the compressor section and entering the combustor, provides a way of supplying secondary flow cooling air to the high pressure turbine components, provides a path for service lines, provides a pressure vessel to prevent leakage of compressor discharge air and accommodates thermal transients between inner and outer rings of the recuperator and turbine support adapter. Additionally, the recuperator and turbine support adapter provides support for a turbine bearing housing. The applicability of the recuperator and turbine support adapter is general in nature and may be utilized in recuperated engines with recuperators having two concentric flow paths.

The thermal spring of the recuperator and turbine support adapter of the present invention is a feature that allows the hot and cold flow paths in the recuperator and turbine support adapter to grow independently of each other due to thermal loading. The spring absorbs the relative thermal growth between the inner and outer strutted bodies. It is designed to do so without incurring large stresses while also preserving the fit, form, and function of the turbine components. Flanges of the present invention serve several functions. The flanges serve as mechanical interface's to their respective mating components. The design of the flanges also includes sufficient bolt hole locations, to provide adequate fastening so as to result in a near air-tight seal. This seal provides protection against air leakage and pressure losses, while allowing for substantial axial growth of the recuperator. In contrast, recuperated turbine engines of the prior art use materials with different coefficients of thermal expansion to accommodate the thermal gradients across the recuperator. None of the recuperated turbine engines of the prior art use either a thermal spring or metal seals between a recuperator and turbine support adapter and a recuperator or a recuperator and turbine support adapter and the combustor case, as in the present invention.

Figure 1:
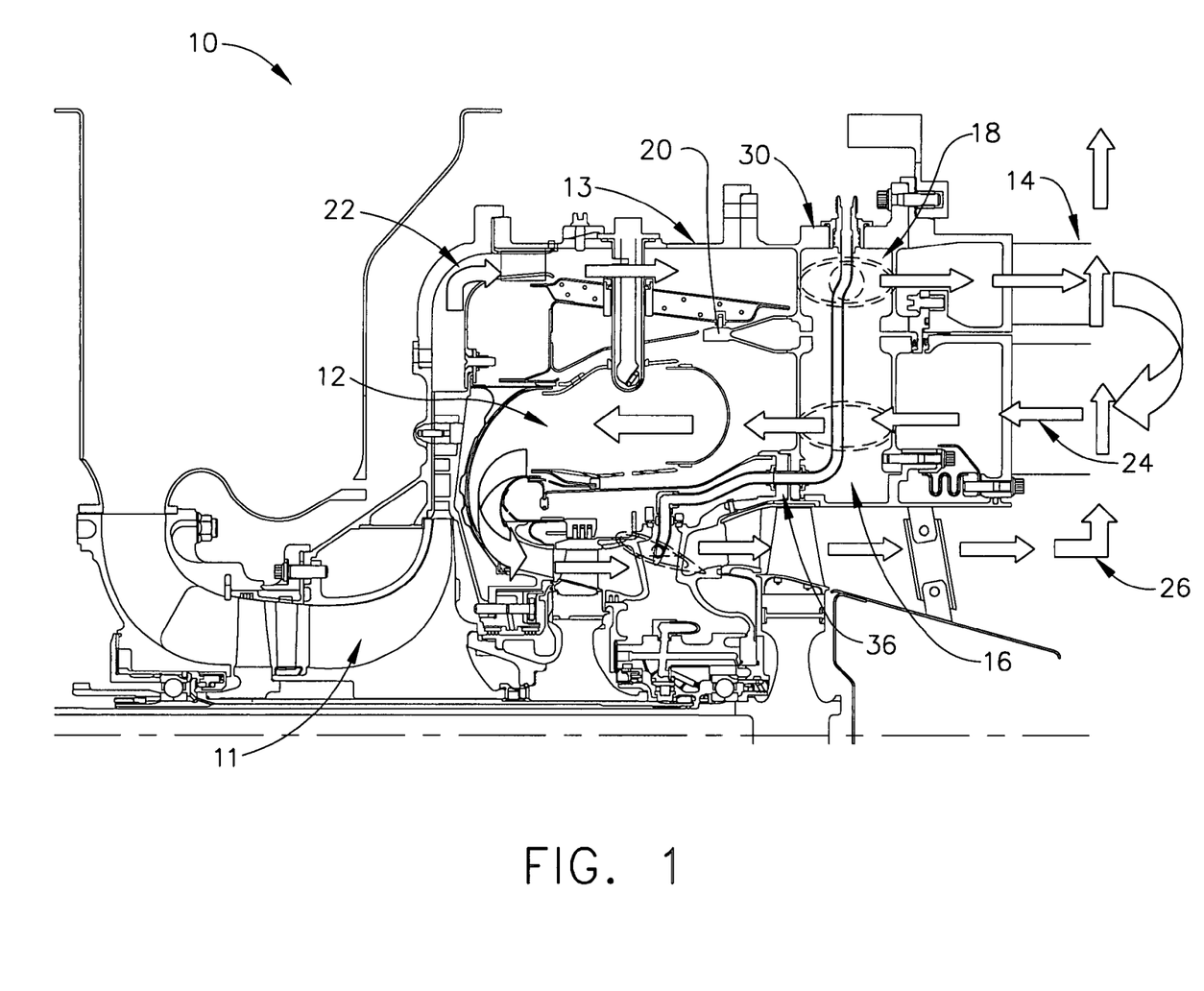
FIG. 1 shows an axial cross-sectional view through a portion of a gas turbine engine, according to the invention.

Illustrated in FIG. 1 is a portion of recuperated gas turbine engine 10, that may include a recuperator and turbine support adapter 30 for securing a combustor 12, recuperator 14, and turbine bearing support housing 36 to the combustor case 13 of the gas turbine engine. The flow of compressed air through engine 10 is also illustrated. Cold air may flow from compressor 11 along outer flow path 22, through outer strutted body 18 of recuperator and turbine support adapter 30, and into recuperator 14. The cold compressed air may be at a temperature of about 500° F. to about 700° F. As it flows through the recuperator, the cold compressed air may be heated to a temperature of about 1100° F. to about 1300° F. by the flow of hot exhaust gas from combustor 12 by way of exhaust gas flow path 26. The heated (or hot) compressed air can flow along inner flow path 24, through inner strutted body 16 of recuperator and turbine support adapter 30, and into combustor 12. The heated (or hot) compressed air may then be used in the combustion process in combustor 12 to produce exhaust gas which can be cycled through recuperator 14 along exhaust flow path 26. It is contemplated that the recuperator and turbine support adapter 30 of the present invention can be used with any recuperated engine. While the exemplary embodiments describe using the recuperator and turbine support adapter 30 with recuperators having two concentric flow paths, the recuperator and turbine support adapter may be modified to be used with other recuperator designs. A non-limiting example of a recuperated gas turbine engine would be a recuperated gas turbine engine adapted for propelling a land vehicle such as, but not limited to, an armored ground vehicle.

Figure 2A:
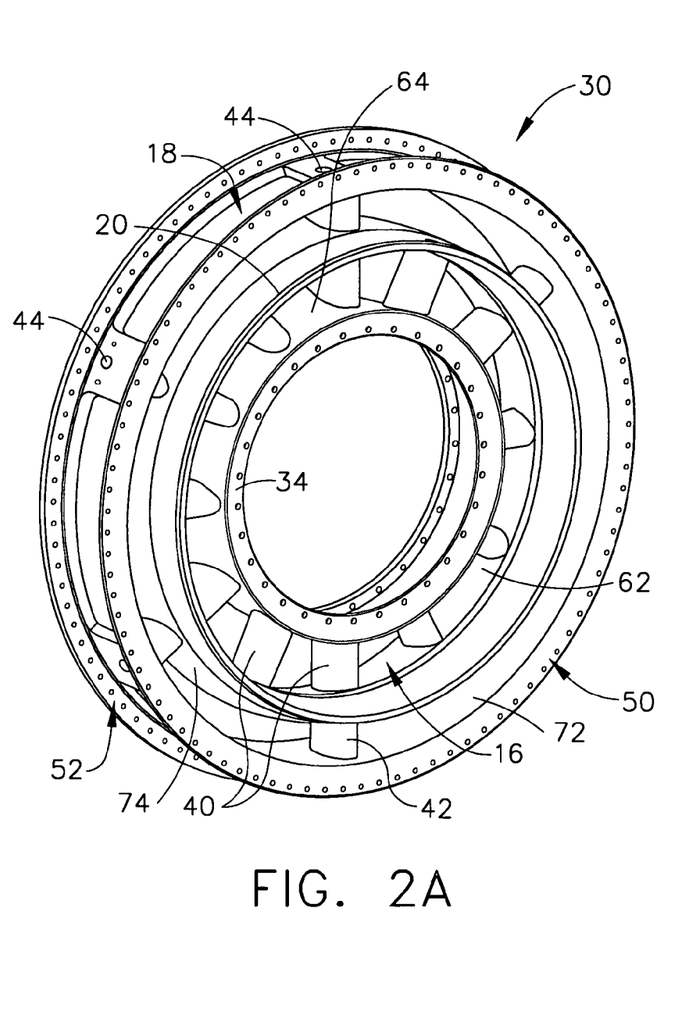
FIG. 2A shows a front view of a recuperator and turbine support adapter for attaching a recuperator to the combustor case, according to the invention.
Figure 2B:
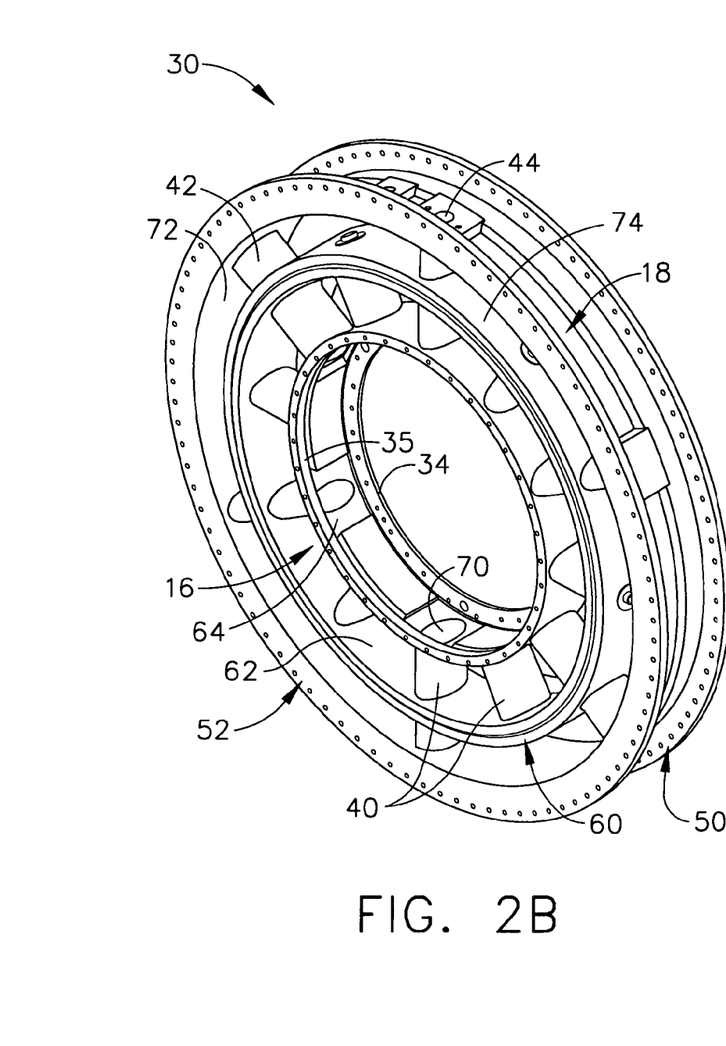
FIG. 2B shows a back view of the recuperator and turbine support adapter of FIG. 2A.
Figure 3A:
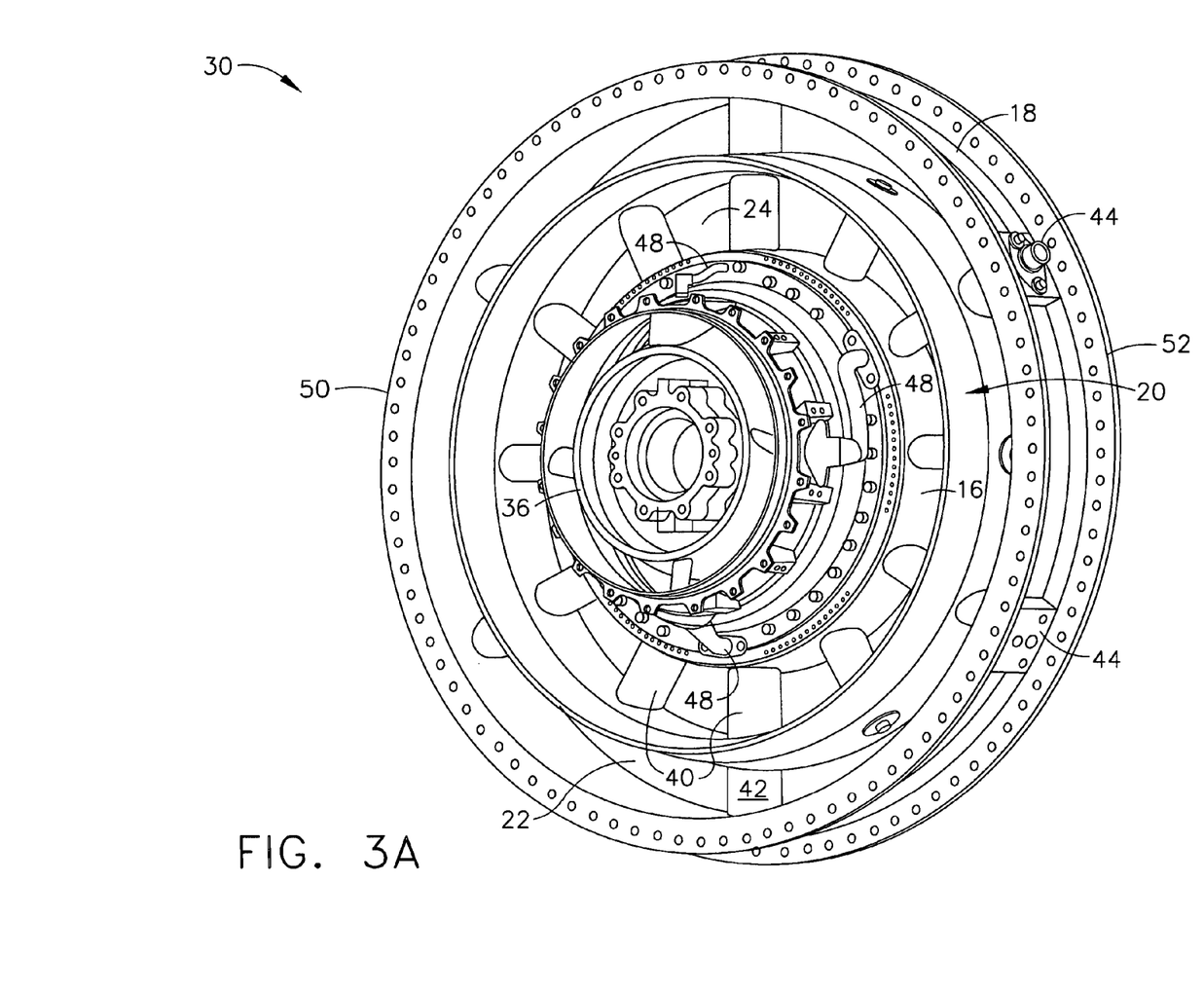
FIG. 3A shows a front view of the recuperator and turbine support adapter of FIG. 2A with a turbine bearing support housing attached, according to the invention.
Figure 3B:
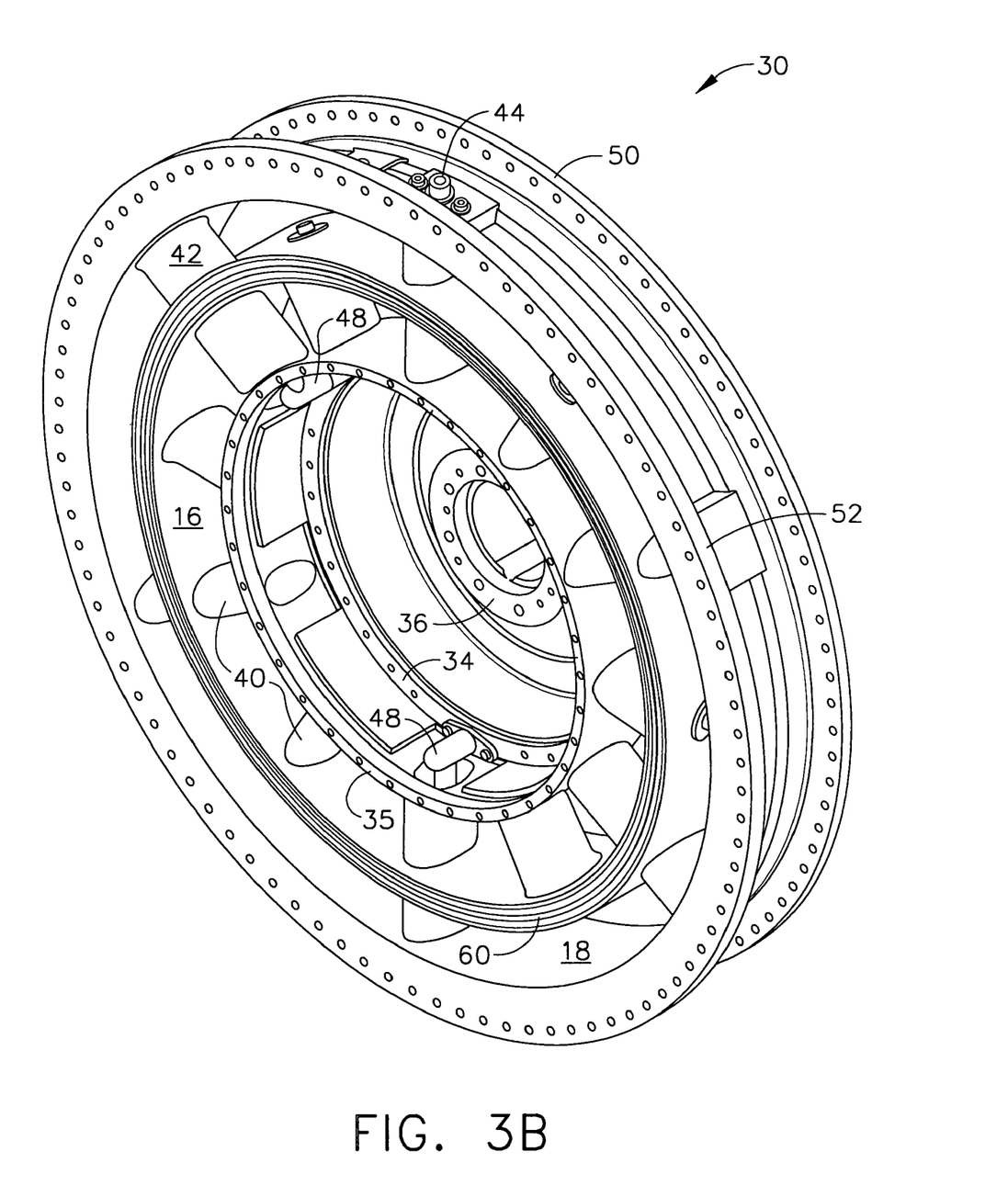
FIG. 3B shows a back view of the assembled recuperator and turbine support adapter of FIG. 3A.

Referring to FIGS. 2A and 2B, recuperator and turbine support adapter 30 for securing a recuperator to a combustor case 13 of the present invention is designated in its entirety by reference number 30. FIG. 2A is a front view of recuperator and turbine support adapter 30, while FIG. 2B provides a back view of recuperator and turbine support adapter 30. FIG. 3A is a front view of recuperator and turbine support adapter 30 with turbine bearing support housing 36 attached, while FIG. 3B provides a back view of recuperator and turbine support adapter 30 with turbine bearing support housing 36 attached. Recuperator and turbine support adapter 30 may comprise annular outer strutted body 18 and annular inner strutted body 16. Thermal spring 20 (FIG. 2A) may connect inner strutted body 16 to outer strutted body 18. Thermal spring 20 may allow for thermal expansion of inner and outer strutted bodies 16, 18, respectively, due to the temperature and pressure differences resulting from the flow of hot and cold compressed air through recuperator and turbine support adapter 30. The presence of thermal spring 20 may result in a decrease or elimination of leakage of the hot or cold compressed air by preserving the fit of inner and outer strutted bodies 16, 18, respectively, within recuperator and turbine support adapter 30 as well as the fit of recuperator and turbine support adapter 30 to other turbine engine components such as combustor case 13, recuperator 14, and turbine bearing support housing 36. The presence of thermal spring 20 may also eliminate or decrease fatigue and distress to recuperator and turbine support adapter 30 by minimizing stresses due to thermal expansion.

In one embodiment, annular inner strutted body 16 may comprise outer ring 62, inner ring 64, and a plurality of inner struts 40 connecting outer and inner rings 62, 64 to each other (see FIG. 2A). Inner struts 40 may be symmetrically or randomly arranged around annular inner strutted body 16. In an illustrative embodiment, annular inner strutted body 16 may comprise at least three inner struts 40. In a second illustrative embodiment, annular inner strutted body 16 may comprise six or twelve inner struts 40. The open area between inner struts 40 may provide an inner flow path 24 for hot compressed air returning from recuperator 14. Although not required, symmetrical arrangement of inner struts 40 around inner strutted body 16 may provide a more optimal air flow. Additionally, one or more of inner struts 40 may comprise an open passage for running service line 48 (see FIGS. 3A–B) through strut 40. The cross-section width of the open passage may be determined by the size of the service line 48 going through strut 40. Non-limiting examples of service lines 48 are oil lines, oil scavenge lines or buffered air seal lines. Alternatively, inner struts 40 may have an open passage for providing cooling air to the turbine cavity. The air provided to the turbine cavity may be used to cool components, such as the shroud surrounding the turbine blades in the turbine area. The minimum number of inner struts 40 in annular inner strutted body 16 may be determined by the number of service lines 48 required to run in and out of recuperator and turbine support adapter 30, and the number of inner struts 40 required to provide cooling air. Likewise, the cross-sectional width of inner struts 40 may be determined based on the function of inner strut 40. Inner struts 40 may all have the same cross-sectional width or they may have two or more different cross-sectional widths. For example, if inner strut 40 is to comprise an open passage for service line 48, the cross-sectional width of inner strut 40 may depend on the size of service line 48 passing through inner strut 40.

Inner strutted body 16 may also comprise second forward flange 34 and second aft flange 35. The forward and aft flanges 34, 35 may be used to connect the recuperator and turbine support adapter 30 to other elements of the engine 10. For example, FIGS. 3A and 3B show turbine bearing support housing 36 attached to second forward flange 34 of inner strutted body 16. When connected in this manner, second forward flange 34 provides a metal seal between recuperator and turbine support adapter 30 and turbine bearing support housing 36. Forward and aft flanges 34, 35 may also include sufficient bolt hole locations, to provide adequate fastening so as to provide a near air-tight seal when recuperator and turbine support adapter 30 is attached to other engine components, including, but not limited to, turbine bearing support housing 36.

In another embodiment of the present invention, outer strutted body 18 may comprise outer ring 72, inner ring 74 and a plurality of outer struts 42 connecting the rings to each other (see FIG. 2B). Outer struts 42 may be symmetrically or randomly arranged around annular outer strutted body 18. In an illustrative embodiment, annular outer strutted body 18 may comprise at least three outer struts 42. In a second illustrative embodiment, annular outer strutted body 18 may comprise six outer struts 42. The number of outer struts 42 of outer strutted body 18 may be the same as the number of inner struts 40 of inner strutted body 16 or the number of inner and outer struts 40, 42 may be different.

The open area between outer struts 42 may provide outer flow path 22 for cold compressed air flowing into recuperator 14. Although not required, symmetrical arrangement of outer struts 42 around outer strutted body 18 may provide a more optimal air flow. Additionally, one or more of outer struts 42 may comprise an open passage for running service line 48 through outer strut 42. The open passage may have first opening 44 on outer ring 72 for service line 48. The dimensions of the open passage may be determined by the size of service line 48 going through outer strut 42. Non-limiting examples of service lines 48 are oil lines, oil scavenge lines or buffered air seal lines. The minimum number of outer struts 42 in the annular outer strutted body 18 may be determined by the number of service lines 48 required to run in and out of recuperator and turbine support adapter 30. Likewise, the cross-sectional width of outer struts 42 may be determined based on the function of the outer strut 42. Outer struts 42 may all have the same cross-sectional width or they may have two or more different cross-sectional widths. For example, if outer strut 42 is to comprise an open passage for service line 48, the cross-section of outer strut 42 will depend on the size of service line 48 passing through outer strut 42.

Outer strutted body 18 may also comprise first forward flange 50 and first aft flange 52. The forward and aft flanges 50, 52 may be used to connect the recuperator and turbine support adapter 30 to other elements of engine 10. For example, first forward flange 50 may connect recuperator and turbine support adapter 30 to combustor case 13. Alternatively, aft flange 52 may connect recuperator and turbine support adapter 30 to recuperator 14 (see FIG. 5). The use of first forward flange 50 and aft flange 52 to connect recuperator and turbine support adapter 30 to combustor case 13 or recuperator 14 may provide a metal seal between recuperator and turbine support adapter 30 and combustor case 13 and recuperator 14, respectively. Forward and aft flanges 50, 52 may also include sufficient bolt hole locations, to provide adequate fastening so as to provide a near air-tight seal when recuperator and turbine support adapter 30 is attached to combustor case 13 or recuperator 14.

Figure 4:
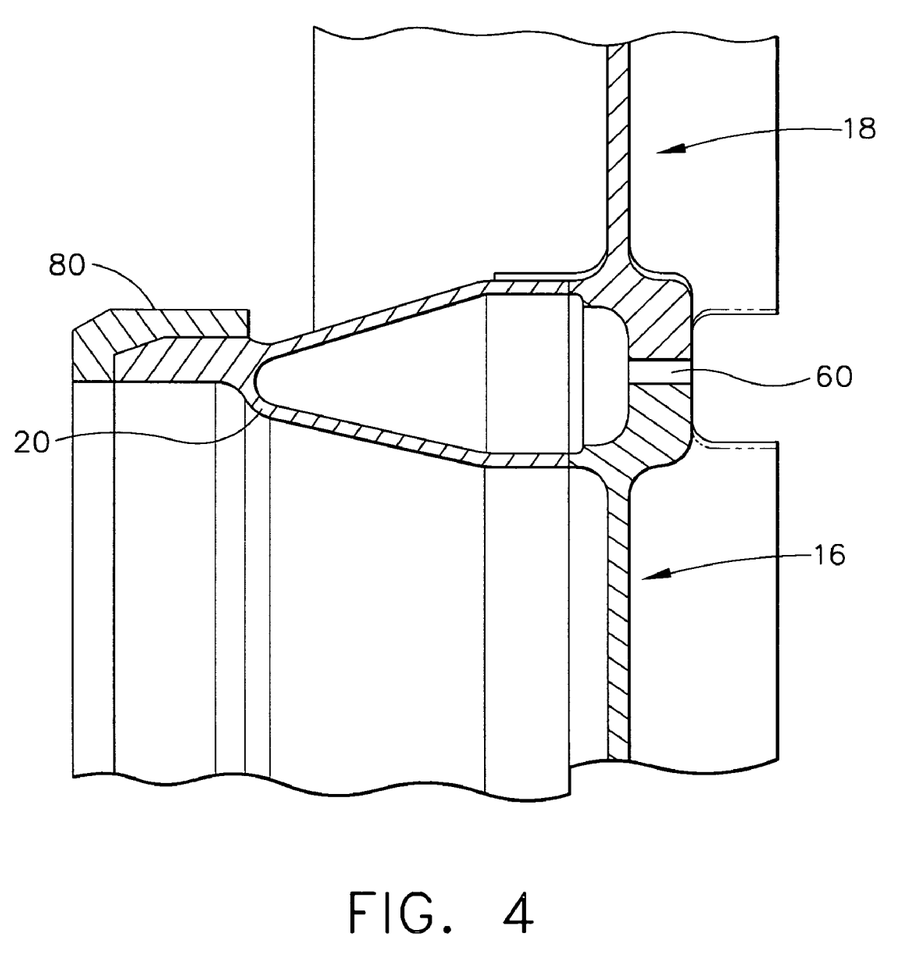
FIG. 4 is a cross-sectional view of a thermal spring and piston ring land employed on a recuperator and turbine support adapter for attaching a recuperator to a combustor case, according to the invention.

In a further embodiment, recuperator and turbine support adapter 30 may comprise thermal spring 20, wherein thermal spring 20 connects annular inner strutted body 16 to annular outer strutted body 18 around the entire circumference of the adapter. FIG. 4 illustrates the attachment of thermal spring 20 to outer strutted body 18 and inner strutted body 16. Thermal spring 20 may provide the only connection between outer strutted body 18 and inner strutted body 16, with space 60 on the back side of recuperator and turbine support adapter 30 running the entire circumference of recuperator and turbine support adapter 30 (FIGS. 2B and 3B). Thermal spring 20 and space 60 may allow for thermal expansion of the recuperator and turbine support adapter 30. When cold compressed air flows through outer flow path 22 and hot compressed air flows through inner flow path 24 of recuperator and turbine support adapter 30, a thermal gradient may be formed, with inner strutted body 16 having a higher temperature than outer strutted body 18. This thermal gradient may place strain on the recuperator and turbine support adapter 30 as the thermal expansion of inner strutted body 16 may be greater than that of outer strutted body 18. With recuperator and turbine support adapter 30 of the present invention, the presence of thermal spring 20 and space 60 may allow for the thermal expansion of inner strutted body 16 without applying undue stress and subsequent damage on outer strutted body 18 by providing room for the expansion of inner strutted body 16. Additionally, there may be a pressure difference between the cold and hot compressed air associated with the temperature differential. Thermal spring 20 may also protect recuperator and turbine support adapter 30 from additional strain by relieving the stress provided by this pressure difference. Thermal spring 20 may further be connected to piston ring land 80 as shown in FIG. 4. Piston ring land 80 may be an optional component of the present invention. Piston ring land 80 may provide an additional seal to control leakage of the compressed air as it flows through recuperator and turbine support adapter 30.

Figure 5:
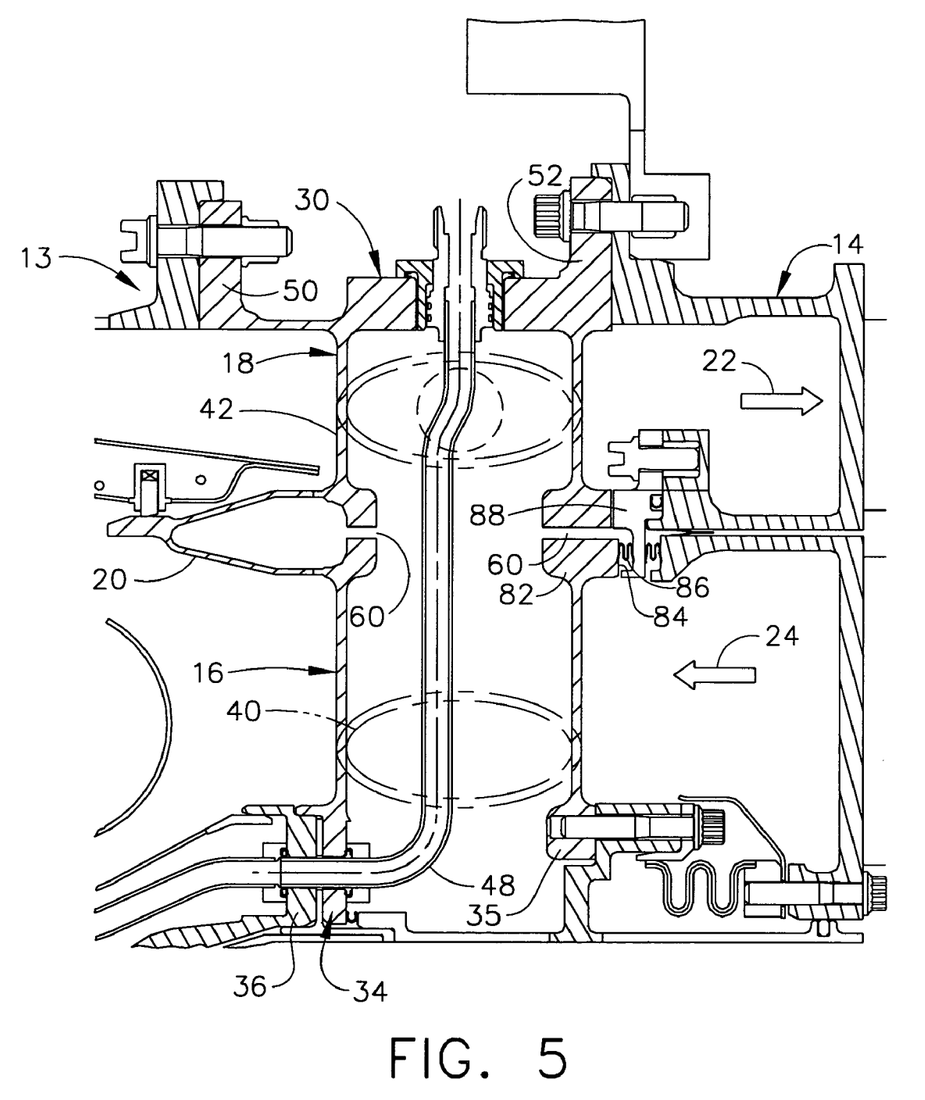
FIG. 5 is an axial cross-sectional view of a gas turbine engine showing a recuperator and turbine support adapter, a portion of a turbine bearing support housing, and a recuperator, according to the invention.

FIG. 5 further illustrates how thermal spring 20, outer strutted body 18 and inner strutted body 16 may be configured. A non-limiting example of the attachment of recuperator and turbine support adapter 30 to recuperator 14 is also illustrated in FIG. 5. Recuperator 14 may be attached to recuperator and turbine support adapter 30 at first aft flange 52 of outer strutted body 18 and second aft flange 35 of inner strutted body 16. First and second aft flanges 52, 35, respectively may also include sufficient bolt hole locations, to provide adequate fastening so as to provide a near air-tight seal when recuperator and turbine support adapter 30 is attached to recuperator 14. Recuperator 14 may further interface with recuperator and turbine support adapter 30 at third aft flange 82 which may be located on second outer ring 62 of inner strutted body 16. Third aft flange 82 may have ground surface 84 for interfacing with recuperator 14. Ground surface 84 of second outer ring 62 of inner strutted body 16 may interface with metallic seal 86. Metallic seal 86 may be installed between ground surface 84 and recuperator sealplate 88. Thermal spring 20 may help prevent distortion of third aft flanges 82, minimizing leakage at the seal interface.

In another embodiment of the invention, recuperator and turbine support adapter 30 may provide open passages for running service lines 48 from the outer surface of recuperator and turbine support adapter 30 to turbine bearing support housing 36 and/or the turbine cavity. The open passages may be formed by providing openings in at least one of inner strut 40 of inner strutted body 16 and at least one of outer strut 42 of outer strutted body 18. These inner and outer struts 40, 42 may then be aligned, forming a single passage going from first opening 44 in outer ring 72 of outer strutted body 18 to second opening 70 of first inner ring 64 of inner strutted body 16. Inner and outer struts 40, 42 aligned to form the open passage may, or may not, have the same cross-sectional width. It will be appreciated that the dimensions of the open passage as well as the cross-sectional width of the inner and outer struts 40, 42 may be dependent on the size of service line 48 running through the open passage.

In yet another embodiment, recuperator and turbine support adapter 30 may provide secondary flow cooling air through open passages in inner struts 40 of the inner strutted body 16 to the high pressure turbine area of engine 10, including the shroud surrounding the turbine blades. The shroud surrounding the turbine blades may reach temperatures as high as about 1500° F. to about 1600° F., and the cold compressed air, having a temperature of from about 500° F. to about 600° F., may be used to cool the shroud.

In one embodiment of the invention, a recuperating system comprising recuperator 14 and recuperator and turbine support adapter 30 is provided. Recuperator and turbine support adapter 30 may comprise annular outer strutted body 18, annular inner strutted body 16 and thermal spring 20. Annular outer strutted body 18 may comprise outer ring 72 and inner ring 74 connected by a plurality of outer struts 42. Annular inner body 16 may comprise outer ring 62 and inner ring 64 connected by a plurality of outer struts 42. Outer strutted body 18 and inner strutted body 16 may be connected by thermal spring 20. Thermal spring 20 may be attached to the front edge of inner ring 74 of outer strutted body 18 and the front edge of outer ring 62 of inner strutted body 16. Thermal spring 20 allows for thermal expansion of recuperator and turbine support adapter 30 without stress and/or damage to recuperator and turbine support adapter 30. Recuperator and turbine support adapter 30 may be made of any material that is typically used in the art for gas turbine blades, recuperated support housings, or other turbine engine parts. Exemplary materials may include nickel-based alloys such as, but not limited to, INCO-718, INCO-706 and INCO-625. The material may be chosen based on strength and toughness at the high temperatures that recuperator and turbine support adapter 30 may be exposed to. Thermal spring 20 may be made of the same material as the inner and outer strutted bodies 16, 18, or of a different material. Thermal spring 20 may have the same or greater strength than the inner and outer strutted bodies 16, 18, in order to absorb the thermal expansion of inner and outer strutted bodies 16, 18 without incurring damage to the thermal spring 20. Likewise, inner strutted body 16 may be made of a different material than outer strutted body 18. By way of non-limiting example, inner strutted body 16 may be made from INCO-625 while outer strutted body 18 may be made from INCO-718.

It is contemplated that recuperator and turbine support adapter 30 of the present invention may be used with recuperators known in the art. The internal construction of the recuperator 14 may vary as long as the outer (cold air) flow path 22 and the inner (hot air) flow path 24 interfaces of both the recuperator and turbine support adapter 30 and recuperator 14 match up. In an illustrative embodiment, the recuperator 14 may have two concentric flow paths, such as that disclosed in commonly assigned U.S. patent application Ser. No. 10/698,716, hereby incorporated by reference.

Figure 6:
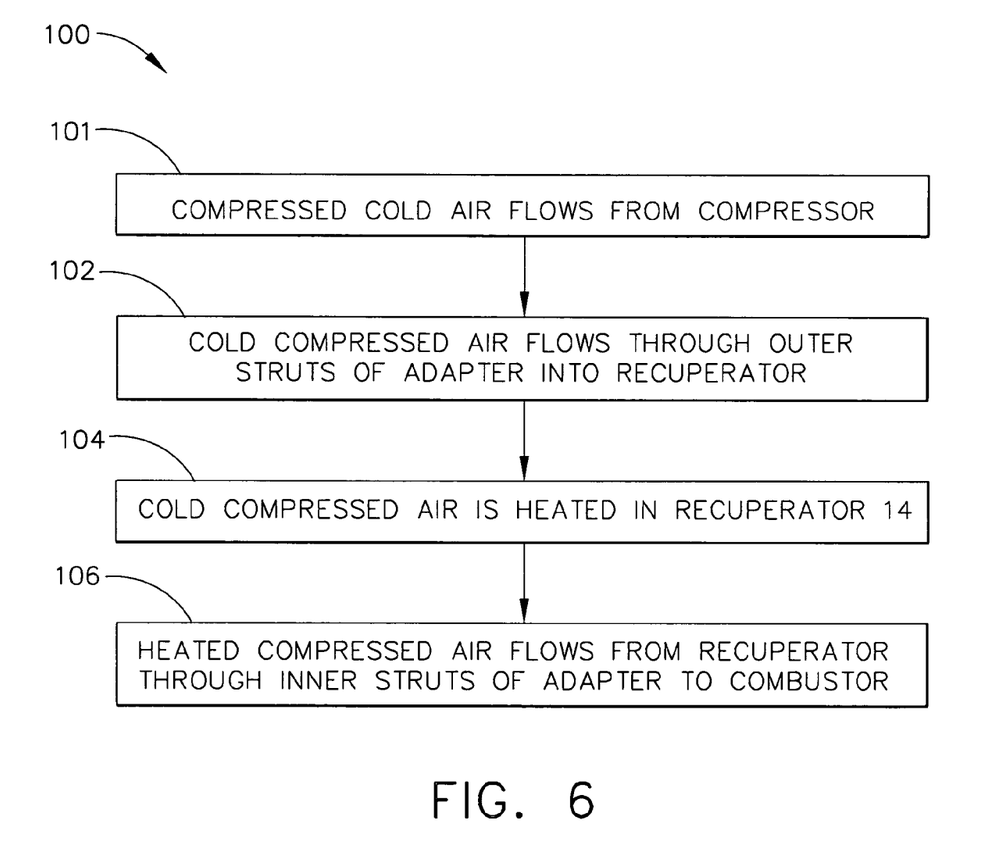
FIG. 6 schematically represents steps involved in a method for heating compressed air in a recuperated gas turbine engine, according to another embodiment of the invention.

With reference to FIG. 6, in another embodiment of the present invention, a method 100 of heating compressed air in a gas turbine engine is provided. The method 100 may comprise step 101 of flowing cold compressed air from the compressor of the gas turbine engine. The "cold" compressed air may be at a temperature of about 500° F. to about 700° F. The method 100 may further comprise step 102 of flowing the cold compressed air between outer struts of an outer strutted body of a recuperator and turbine support adapter into a recuperator, wherein the recuperator and turbine support adapter may be designed for securing the recuperator to a combustor case of the gas turbine engine. Thereafter, step 104 may involve heating the compressed air in the recuperator. During step 104, the compressed air may be heated from about 500° F. to about 700° F. to a temperature of about 1100° F. to about 1300° F. Thereafter, step 106 may involve flowing the heated compressed air from the recuperator to a combustor, wherein the heated compressed air flows between inner struts of an inner strutted body of the adapter. The recuperator and turbine support adapter may comprise an annular outer strutted body, and the outer strutted body may comprise an outer ring and an inner ring connected by a plurality of struts; an annular inner strutted body, wherein the inner strutted body may comprise an outer ring and an inner ring connected by a plurality of struts; and a thermal spring connecting the inner ring of the outer strutted body to the outer ring of the inner strutted body.

It should be understood, of course, that the foregoing relates to exemplary embodiments of the invention and that modifications may be made without departing from the spirit and scope of the invention as set forth in the following claims.

We claim:

1. A recuperator and turbine support adapter for securing a recuperator to a support housing, comprising:
   an annular outer strutted body, wherein the outer strutted body comprises a first outer ring and a first inner ring, the first outer ring and the first inner ring connected by a plurality of outer struts;
   an annular inner strutted body, wherein the inner strutted body comprises a second outer ring and a second inner ring, the second outer ring and the second inner ring connected by a plurality of inner struts; and
   a thermal spring connecting the first inner ring of the outer strutted body to the second outer ring of the inner strutted body.

2. The recuperator and turbine support adapter of claim 1 wherein the outer strutted body comprises at least three outer struts.

3. The recuperator and turbine support adapter of claim 1 wherein the inner strutted body comprises at least three inner struts.

4. The recuperator and turbine support adapter of claim 1 wherein the plurality of outer struts are symmetrically arranged around the outer strutted body.

5. The recuperator and turbine support adapter of claim 1 wherein the plurality of inner struts are symmetrically arranged around the inner strutted body.

6. The recuperator and turbine support adapter of claim 1 wherein the number of inner struts is the same as the number of outer struts.

7. The recuperator and turbine support adapter of claim 6 wherein the outer struts of the outer strutted body are aligned with the inner struts of the inner strutted body.

8. The recuperator and turbine support adapter of claim 1 wherein at least one outer strut of the outer strutted body is aligned with at least one inner strut of the inner strutted body.

9. The recuperator and turbine support adapter of claim 8 wherein the aligned at least one outer strut and the aligned at least one inner strut jointly form an open passage for a service line.

10. The recuperator and turbine support adapter of claim 9 wherein the service line is an oil line, an oil scavenger line or a buffered air seal line.

11. The recuperator and turbine support adapter of claim 1 wherein the recuperator and turbine support adapter comprises a nickel based alloy.

12. The recuperator and turbine support adapter of claim 1 wherein the first outer ring of the outer strutted body comprises a first forward flange and a first aft flange.

13. The recuperator and turbine support adapter of claim 1 wherein the second inner ring of the inner strutted body comprises a second forward flange and a second aft flange.

14. A recuperator and turbine support adapter for securing a recuperator to a support housing, comprising:
   an annular outer strutted body, wherein the outer strutted body comprises a first outer ring and a first inner ring, the first outer ring connected to the first inner ring by at least three outer struts, wherein the outer struts are symmetrically arranged around the outer strutted body, and wherein the outer strutted body further comprises a first forward flange and a first aft flange, the first forward flange and the first aft flange disposed on the first outer ring;
   an annular inner strutted body wherein the inner strutted body comprises a second outer ring and a second inner ring, the second outer ring connected to the second inner ring by at least three inner struts, wherein the inner struts are symmetrically arranged around the inner strutted body, and wherein the inner strutted body further comprises a second forward flange and a second aft flange, the second forward flange and the second aft flange disposed on the second inner ring;
   wherein at least one outer strut and at least one inner strut are aligned with one another to provide an open passage; and
   a thermal spring connecting the first inner ring of the outer strutted body to the second outer ring of the inner strutted body.

15. The recuperator and turbine support adapter of claim 14 wherein at least two of the outer struts of the outer strutted body have different cross-sections.

16. The recuperator and turbine support adapter of claim 14 wherein the number of inner struts of the inner strutted body is twice the number of outer struts of the outer strutted body.

17. The recuperator and turbine support adapter of claim 16 wherein all the outer struts of the outer strutted body are aligned with the inner struts of the inner strutted body.

18. The recuperator and turbine support adapter of claim 14 wherein the number of outer struts of the outer strutted body is the same as the number of inner struts of the inner strutted body.

19. A recuperator system for a gas turbine engine comprising:
   a recuperator; and
   a recuperator and turbine support adapter coupled to the recuperator, wherein the recuperator and turbine support adapter comprises an annular outer strutted body, wherein the outer strutted body comprises a first outer ring and a first inner ring connected by a plurality of outer struts, an annular inner strutted body wherein the inner strutted body comprises a second outer ring and a second inner ring, the second outer rind and the second inner ring connected by a plurality of inner struts, and a thermal spring connecting the inner ring of the outer strutted body and the outer ring of the inner strutted body.

20. The recuperator system of claim 19 wherein the first outer ring of the outer strutted body comprises a first forward flange and a first aft flange.

21. The recuperator system of claim 20 wherein the recuperator is attached to the recuperator and turbine support adapter at the first aft flange of the first outer ring of the outer strutted body, forming a metal seal between the recuperator and turbine support adapter and the recuperator.

22. The recuperator system of claim 20 further comprising a combustor case, wherein the combustor case is attached to the recuperator and turbine support adapter at the first forward flange of the first outer ring of the outer strutted body, forming a metal seal between the recuperator and turbine support adapter and the combustor case.

23. The recuperator system of claim 19 wherein the second inner ring of the inner strutted body comprises a second forward flange and a second aft flange.

24. The recuperator system of claim 23 further comprising a turbine bearing support housing, wherein the turbine bearing support housing is attached to the recuperator and turbine support adapter at the second forward flange of the second inner ring of the inner strutted body, forming a metal seal between the recuperator and turbine support adapter and the turbine bearing support housing.

25. A recuperated turbine engine comprising:
   a gas turbine engine;
   a recuperator coupled to the gas turbine engine;
   a recuperator and turbine support adapter coupled to the recuperator and the gas turbine engine, wherein the recuperator and turbine support adapter comprises an annular outer strutted body, wherein the outer strutted body comprises a first outer ring and a first inner ring, the first outer ring and the first inner ring connected by a plurality of outer struts, wherein the first outer ring comprises a first forward flange and a first aft flange; an annular inner strutted body, wherein the inner strutted body comprises a second outer ring and a second inner ring, the second outer ring and the second inner ring connected by a plurality of inner struts, wherein the second inner ring comprises a second forward flange and a second aft flange; and a thermal spring connecting the first inner ring of the outer strutted body to the second outer ring of the inner strutted body; and
   a combustor case for securing the recuperator and turbine support adapter and the recuperator to the gas turbine engine.

26. The recuperated turbine engine of claim 25 wherein the gas turbine engine is an LV-50 gas turbine engine.

27. The recuperated turbine engine of claim 25 wherein the recuperated turbine engine is adapted for propelling a land vehicle.

28. A method of heating compressed air in a gas turbine engine, comprising:
   flowing cold compressed air between outer struts of an outer strutted body of a recuperator and turbine support adapter into a recuperator, the recuperator and turbine support adapter for securing the recuperator to a combustor case of the gas turbine engine;
   heating the cold compressed air in the recuperator to provide heated compressed air; and
   flowing the heated compressed air from the recuperator to a combustor, wherein the heated compressed air flows between inner struts of an inner strutted body of the recuperator and turbine support adapter,
   wherein the recuperator and turbine support adapter comprises an annular outer strutted body, wherein the outer strutted body comprises a first outer ring and a first inner ring, the first outer ring and the first inner ring connected by a plurality of outer struts, an annular inner strutted body wherein the inner strutted body comprises a second outer ring and a second inner ring, the second outer ring and the second inner ring connected by a plurality of inner struts, and a thermal spring connecting the first inner ring of the outer strutted body to the second outer ring of the inner strutted body.

29. The method of claim 28 wherein the cold compressed air has a temperature of from about 500° F. to about 700° F.

30. The method of claim 28 wherein the cold compressed air is heated to a temperature of from about 1100° F. to about 1300° F.

* * * * *